(12) United States Patent
Gerding et al.

(10) Patent No.: US 9,964,426 B2
(45) Date of Patent: May 8, 2018

(54) PROCESS AND APPARATUS FOR THE MEASUREMENT

(71) Applicant: KROHNE S.A.S., Romans-sur-Isère (FR)

(72) Inventors: Michael Gerding, Bochum (DE); Vincent Pichot, Romans-sur-Isere (FR)

(73) Assignee: KROHNE S.A.S., Romans-sur-Isère (FR)

( * ) Notice: Subject to any disclaimer, the term of this patent is extended or adjusted under 35 U.S.C. 154(b) by 159 days.

(21) Appl. No.: 14/882,847

(22) Filed: Oct. 14, 2015

(65) Prior Publication Data

US 2016/0245685 A1    Aug. 25, 2016

(30) Foreign Application Priority Data

Oct. 10, 2014   (DE) .................. 10 2014 114 752

(51) Int. Cl.
   *G01F 23/284* (2006.01)
(52) U.S. Cl.
   CPC .................. *G01F 23/284* (2013.01)
(58) Field of Classification Search
   USPC .............. 324/644, 691; 73/290 R; 342/124
   See application file for complete search history.

(56) References Cited

U.S. PATENT DOCUMENTS

| | | |
|---|---|---|
| 4,695,787 A | 9/1987 | Billet et al. |
| 4,807,471 A | 2/1989 | Cournane et al. |
| 5,376,888 A | 12/1994 | Hook |
| 6,662,648 B2 | 12/2003 | Fehrenbach et al. |
| 6,972,712 B1 * | 12/2005 | Karlsson ............... G01F 23/284 342/124 |
| 7,477,059 B2 | 1/2009 | Carobbio |
| 7,525,476 B1 | 4/2009 | Delin et al. |
| 7,965,087 B2 | 6/2011 | Reimelt et al. |
| 9,069,056 B2 | 6/2015 | Janitch |
| 2002/0026828 A1 * | 3/2002 | Fehrenbach .......... G01F 23/284 73/290 V |
| 2007/0194799 A1 * | 8/2007 | Carobbio .............. G01F 23/284 324/644 |
| 2008/0186076 A1 * | 8/2008 | Kawama .............. H04B 17/318 327/336 |
| 2008/0309547 A1 | 12/2008 | Michalski |
| 2010/0127848 A1 | 5/2010 | Mustapha et al. |

FOREIGN PATENT DOCUMENTS

| | | |
|---|---|---|
| GB | 2492691 A | 1/2013 |
| WO | 02/063249 A2 | 8/2002 |

* cited by examiner

*Primary Examiner* — Vincent Q Nguyen
(74) *Attorney, Agent, or Firm* — David S. Safran

(57) ABSTRACT

A method and device for level measurement according to the propagation time method in which at least one conductor unit (1) is supplied with pulse-like electromagnetic transmission signals and in which electromagnetic response signals are tapped from the conductor unit (1). The method for level determination is improved as compared to the prior art by the conductor unit (1) being supplied with transmission signals with either positive or negative polarity.

5 Claims, 3 Drawing Sheets

PROCESS AND APPARATUS FOR THE MEASUREMENT

BACKGROUND OF THE INVENTION

Field of the Invention

The invention relates to a method for level measurement according to the propagation time method, at least one conductor unit being supplied with pulse-like electromagnetic transmission signals and electromagnetic response signals being tapped from the conductor unit. Furthermore the invention relates to a device for level measurement according to the propagation time method with at least one conductor unit, with at least one electronic device for supplying the conductor unit with pulse-like electromagnetic transmission signals and for tapping of electromagnetic response signals from the conductor unit, and with at least one evaluation device for evaluation of the response signals.

Description of Related Art

In a level measurement device which works according to the propagation time method the so-called TDR measurement principle (time domain reflectometry) is used by the propagation time of electromagnetic signals which have been routed along a conductor unit being evaluated. The conductor unit consists for example of an electrically conductive cable, of a coaxial line, of two adjacent conductors or of at least one conductive bar. The transmission signals are emitted along the conductor unit in the direction of the surface of the medium whose level is to be determined. When the signals strike the surface of the medium, they are in part reflected there. The level of the medium can be determined from the time between the emission and the reception of the reflected response signals. The major advantage of guiding the microwave signals is that changing ambient conditions (for example, a rising or a falling ambient pressure, rising or falling temperature) do not adversely affect the measurement accuracy and that moreover the propagation time of the signal is essentially independent of the dielectric constant of the medium.

The transmission signals are often individual pulses (see, for example, U.S. Pat. No. 6,662,648 B2 or U.S. Pat. No. 7,477,059 B2) which have a positive or negative polarity depending on the sign of the amplitude of the pulse (see for example U.S. Patent Application Publication 2008/0309547 A1).

In order to improve the evaluation of the response signals, providing mechanical reference reflectors along the conductor unit is disclosed for example in U.S. Pat. No. 7,525,476 B1 or U.S. Pat. No. 9,069,056 B2.

SUMMARY OF THE INVENTION

Therefore, the object of the invention is to propose a method as well as a device for level determination which are improved compared to the prior art.

The method in accordance with the invention in which the aforementioned object is achieved is first of all characterized essentially in that the conductor unit is supplied either with transmission signals with positive polarity or with transmission signals with negative polarity. In particular the switching between the polarities is advantageous so that transmission signals with positive and negative polarity are produced in alternation.

In the method in accordance with the invention, transmission signals with positive or negative polarity are used. In one configuration, this takes place in alternation. In another configuration, the transmission signals are generated with a definable sequence with respect to the polarity.

In one configuration, it is provided that the conductor unit is supplied with at least one first transmission signal with positive polarity or negative polarity. Thereupon at least one first response signal is tapped from the conductor unit and stored. Then, the conductor unit is supplied with at least one second transmission signal with negative polarity or positive polarity—the second transmission signal therefore has polarity reversed from the first transmission signal. Thereupon at least one second response signal is tapped from the conductor unit. Then at least the first response signal and the second response signal are evaluated jointly. In one configuration the two response signals are subtracted from one another. This increases the dynamics.

In one alternative configuration, the two response signals are compared to one another in the evaluation in order for example to check the entire measured distance. This takes place under the assumption that the measurement conditions have not changed significantly, for example due to the short time between the transmission signals. Under this condition—in the ideal or normal case—the change of the polarity of the transmission signals would have to lead a change of the polarity of the response signals. Deviations therefrom could be evaluated as indications of the presence of a fault.

In another configuration, the conductor unit is supplied with at least one transmission signal. Here at least one reference signal is generated by a reference device which is located along the conductor unit in reaction to the transmission signal in the case in which the transmission signal has a polarity which is assigned to the reference device. If the transmission signal has another polarity, a reference signal is not generated. The reference device therefore enables reference signals which can occur dictated by the type of transmission signal, but which need not be present in each measurement. Therefore, a reference signal which can be switched on or off arises.

The reference device has the advantage that reference signals can be obtained from a part of a measured distance which can be designated active by this part also being able to be covered by the medium and by a level also being able to be determined for this region. In the prior art there are generally reference devices only in those regions for which normally a level measurement is not conventional or possible.

In one configuration, moreover, it is provided that the reference device generates the reference signal such that the reference signal is dependent on at least one further process variable. In one configuration the further process variable— as a supplement to the level which is to be determined by the method in accordance with the invention—is the temperature. Alternatively it is the pressure. The temperature can be determined, for example, by using a temperature-dependent resistance element.

In the following configuration, the polarity of the transmission signals is used to monitor the components which are used for the measurement.

Thus, it is provided that the conductor unit is supplied with the transmission signals by an electronic device. The response signals are likewise tapped by the electronic device. The electronic device here has at least one first and one second component. At least one signal between the first and the second component is evaluated with respect to the polarity of a transmission signal for monitoring. In this configuration therefore the polarity is used as an indicator in order to test individual components or the communication between individual components of the electronic device. For example, if the polarity changes or the stipulated polarity does not arise, obviously there is a fault.

According to another teaching, the invention relates to a device for level determination which is characterized at least in that the electronic device supplies the conductor unit either with transmission signals with positive polarity or with transmission signals with negative polarity.

The aforementioned details with respect to the method apply accordingly to the device and vice versa.

In one configuration, it is provided that in a storage unit the evaluation device stores at least one first response signal which has been tapped from the conductor unit after the conductor unit has been supplied with a transmission signal of positive polarity or negative polarity. Furthermore, the evaluation device evaluates with the stored first response signal at least one second response signal which has been tapped from the conductor unit after the conductor unit is supplied with a transmission signal of negative polarity or positive polarity. The two transmission signals which differ from one another with respect to their polarity are preferably sent early in succession so that the level which is to be measured cannot change significantly in the interim.

In one configuration, the first response signal and the second response signal are subtracted from one another.

In one configuration, there is at least one reference device along the conductor unit. The reference device is assigned exactly one polarity of the transmission signals—therefore positive or negative polarity. Furthermore, the reference device is made such that it generates a reference signal, but that it only generates a reference signal when an electromagnetic signal which is propagating along the conductor unit has the assigned polarity. Therefore, if the reference device is assigned a positive polarity, it generates a reference signal only when the transmission signal has a positive polarity. In other words: The reference device functions only at a certain polarity and generates a reference signal only at the certain polarity.

In one configuration, it is provided that the reference device has at least one diode. Alternatively or in addition, there is a temperature-dependent resistance element which allows the measurement of the temperature in the vicinity of the reference device. In this configuration, the reference device could also be called the temperature measurement site.

In one configuration, the electronic device has at least one first and one second component. Here at least one signal between the first and the second component is supplied to the evaluation device. This takes place, for example, through a signal line. The evaluation device then evaluates the signal with respect to the polarity.

In one configuration, in the electronic device, there are two ASICs (application-specific integrated circuit), each ASIC generating transmission signals with another polarity. In one alternative configuration, in the electronic device there is only one ASIC which generates the transmission signals with two polarities and which can be switched over for the respective polarity of the generated transmission signals.

In particular, there are a host of possibilities for embodying and developing the method in accordance with the invention and the device in accordance with the invention. For this purpose reference is made to the following description of exemplary embodiments in conjunction with the accompanying drawings.

DETAILED DESCRIPTION OF THE INVENTION

Figure 1:
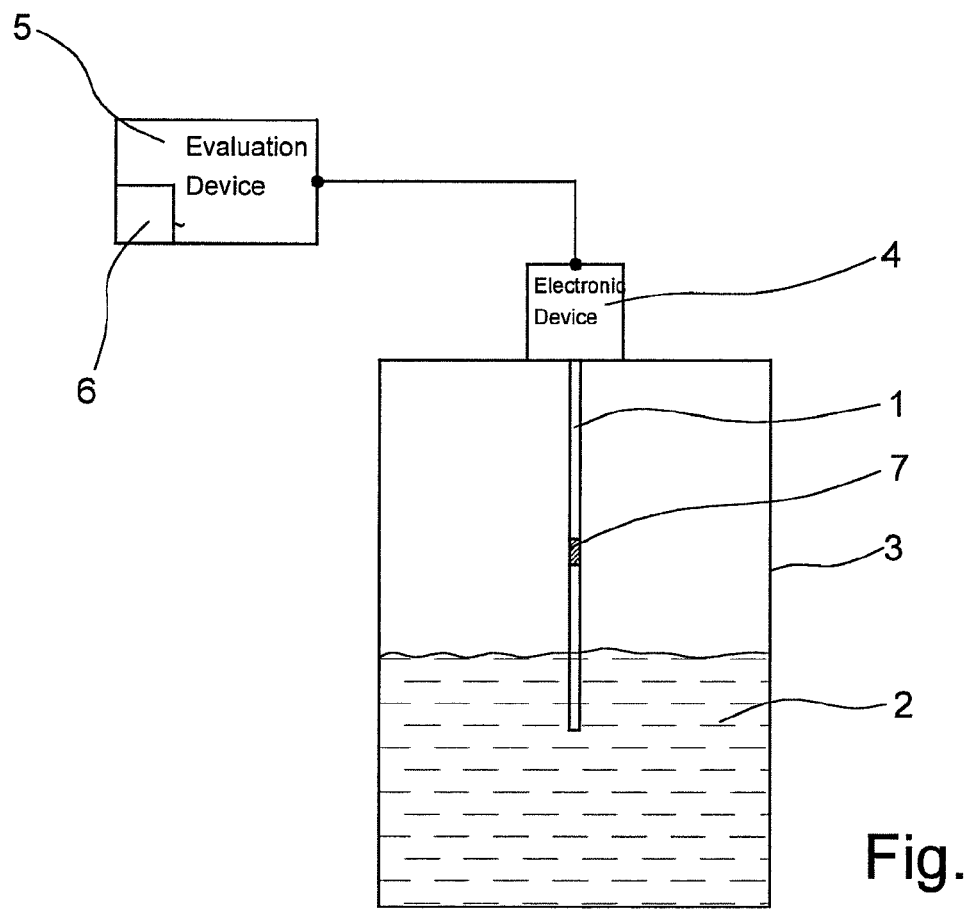
FIG. 1 shows a schematic of one arrangement for measuring the level.

In FIG. 1 a cable—in the prior art also called bars—is used as the conductor unit 1 for measuring the level of the medium 2 in the container 3.

For the measurement the conductor unit 1 is supplied by the electronic device 4 with pulse-like electromagnetic transmission signals. The transmission signals propagate in the direction to the medium 2 and are reflected on the surface of the medium 2 and return as echo signals to the electronic device 4. Electromagnetic signals are tapped there as response signals and are evaluated by an evaluation device 5. The distance between the surface of the medium 2 and the electronic device 4 can be determined from the time between emission of the transmission signals and reception of the response signals. In one alternative configuration which is not shown, the electronic device 4 and the evaluation device 5 are combined in one unit.

The particular feature here lies in that the transmission signals have positive or negative polarity. This means that the transmission signals each have at least one peak and that for each transmission signal the sign of the peak can be chosen so that the signals have positive or negative amplitude.

The evaluation device 5 has a storage unit 6 in order to store response signals in it. This makes it possible for example to directly process with one another response signals which belong to one measurement of the level. In this way, an improvement of dynamics can be achieved by response signals which go back to transmission signals with different polarity being subtracted from one another.

Therefore, for example, a first transmission signal with one polarity—therefore positive or negative—is generated and the conductor unit 1 is supplied with it. Thereupon a first response signal is tapped and stored in the storage unit 6. Then, a second transmission signal with the reverse polarity—therefore negative or positive—is generated and the conductor unit 1 is supplied with it. The second response signal which has thereupon been tapped from the conductor unit 1 is processed with the first response signal by the two response signals being subtracted from one another.

Furthermore, there is a reference device 7 along the conductor unit 1. The reference device 7 is configured such that one polarity is assigned to it. The assignment relates to the fact that the reference device 7 generates a reference signal in the case, and only in the case, in which the transmission signal has the assigned polarity. The reference signal can be recognized, in particular, as an additional signal in the response signal.

Figure 2:
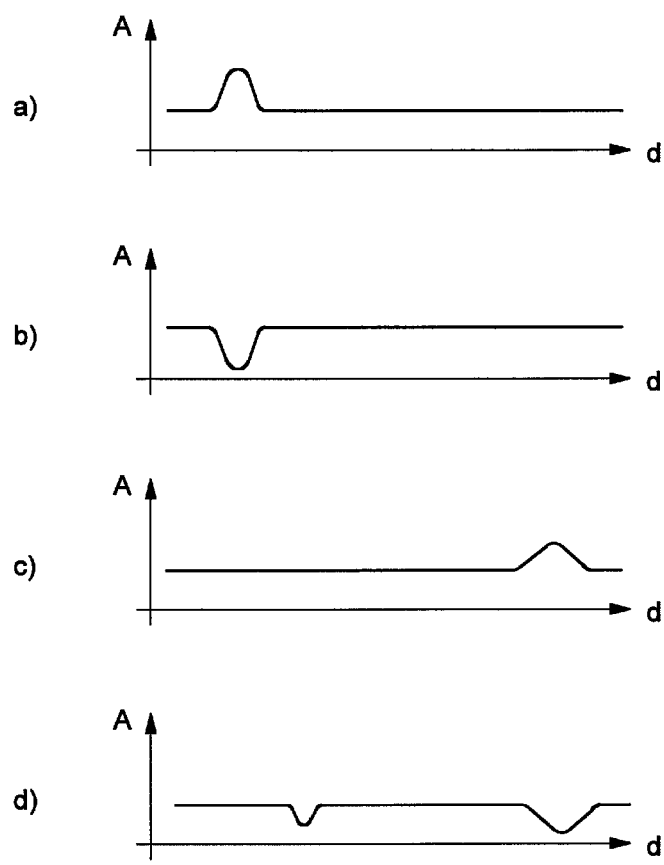
FIG. 2 shows four schematically shown signals during a level measurement.

FIG. 2 shows four exemplary and purely schematic characteristics—a) to d)—of signals. They are two transmission signals (signals a) and b)) and two response signals (signals c) and d)), the transmission signals and the response signals each belonging together (accordingly signals a) and d) and signals b) and c)). The amplitude A is plotted over the distance d.

The transmission signals a) and b) each have different polarities: one positive and one negative. When these transmission signals are reflected on the surface of the medium, the response signals d) and c) arise. It can be recognized on them which polarity the transmission signals have.

Furthermore, in the characteristic of the response signal d) an additional signal can be recognized which is generated by the reference device. The reference signal arises only when an electromagnetic signal which is propagating along the conductor unit 1 has the appropriate polarity. Therefore, it is possible to generate this reference signal in a dedicated manner, for example, via the stipulation of the polarity of the transmission signal. The reference signal has the advantage that a calibration of the response signals is possible by the known position of the reference device along the conductor unit 1.

Figure 3:
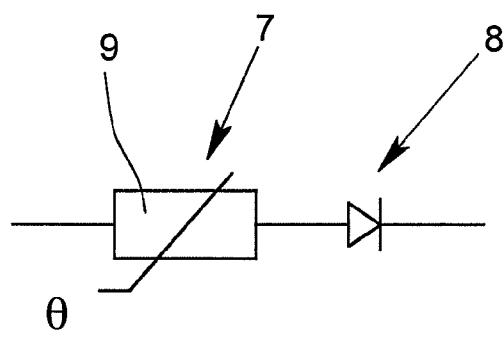
FIG. 3 shows a purely schematic representation of elements of a reference device and FIG. 4 shows a schematic of one part of a device for level determination.

FIG. 3 shows one part of the reference device 7. The component which is responsible for only one polarity of the transmission signal leading to the reference signal is a diode 8 here. Furthermore, there is, in addition, a temperature-dependent resistance element 9 which is connected in series to the diode 8 and which provides for a conclusion being possible about the temperature which is prevailing at the site of the reference device 7, and theta ($\theta$) represents the temperature dependence effect.

Figure 4:
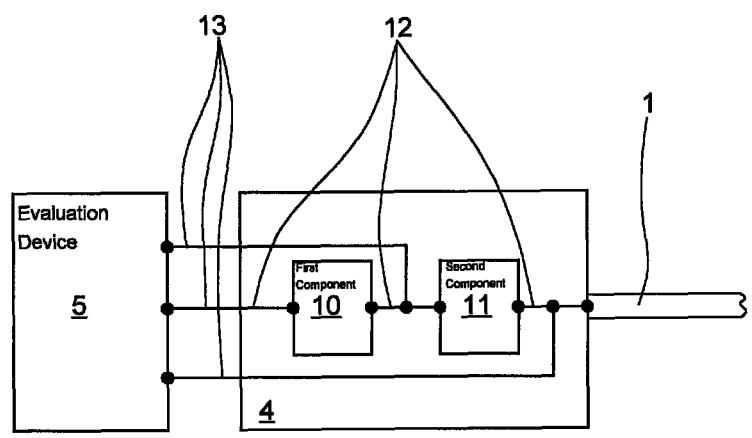

FIG. 4 shows a schematic of one part of the device for level determination, the focus being on the electronic device 4. In the example, it is illustrated how the components of the electronic device 4 are monitored via the polarity of the transmission signals.

For example, the electronic device 4 has a first component 10 and a second component 11 which are connected to one another via a connection 12. Connections 12 furthermore exist between the two components 10, 11 and the evaluation device 5 and the conductor unit 1.

In order to be able to evaluate the signals to, from and between the two components 10, 11, there are pick-off lines 13 to the evaluation device 5.

If the first component 10 generates a signal or information which is associated, for example, with a positive polarity of the transmission signal, and this leads to the second component 11 likewise generating a signal which is associated with positive polarity, everything is proper. But if a change of polarity arises, this indicates a fault.

Conversely for example, analog-digital or digital-analog converters can be monitored with this. One component 10, 11 is for example a microprocessor, an ASIC or any control unit, for example, a human-machine interface.

What is claimed is:

1. A method for level measurement according to the propagation time method, comprising the steps of:

supplying at least one conductor unit with pulse-like electromagnetic transmission signals and tapping electromagnetic response signals from the conductor unit, wherein the pulse-like electromagnetic transmission signals supplied to the conductor unit comprise either transmission signals with positive polarity or transmission signals with negative polarity, and wherein a polarity is assigned to a reference device which is located along the conductor unit, and wherein at least one reference signal is generated by the reference device in response to the supplying of at least one of said pulse-like electromagnetic transmission signal in the case in which the at least one pulse-like electromagnetic transmission signal has the same polarity as is assigned to the reference device.

2. The method as claimed in claim 1, wherein the pulse-like electromagnetic transmission signals supplied to the conductor unit comprise at least one first transmission signal with positive polarity or negative polarity and at least one second transmission signal with the opposite polarity relative to that of the at least one first transmission signal, wherein at least one first response signal is tapped from the conductor unit and stored when the at least one first transmission signal is supplied to the conductor unit, wherein at least one second response signal is tapped from the conductor unit when the conductor unit is supplied with the at least one second transmission signal, and wherein the at least one first response signal and the at least one second response signal are evaluated jointly by one of the at least one first response signal or the at least one second response signal being subtracted from the other of the at least one first response signal or the at least one second response signal.

3. The method as claimed in claim 1, wherein the reference device generates the reference signal such that the reference signal is dependent on at least one additional process variable.

4. The method as claimed in claim 3, wherein said at least one additional process variable is temperature.

5. The method as claimed in claim 1, wherein the conductor unit is supplied with the pulse-like electromagnetic transmission signals by an electronic device, wherein the response signals are tapped by the electronic device and wherein at least one signal between a first component of the electronic device and a second component of the electronic device is evaluated with respect to the polarity of the pulse-like electromagnetic transmission signals.

* * * * *